United States Patent
Kimura et al.

(10) Patent No.: US 11,265,458 B2
(45) Date of Patent: Mar. 1, 2022

(54) APPARATUS, METHOD FOR CONTROLLING THE SAME, AND STORAGE MEDIUM COMPUTER-READABLY STORING PROGRAM

(71) Applicant: CANON KABUSHIKI KAISHA, Tokyo (JP)

(72) Inventors: Takayuki Kimura, Kanagawa (JP); Genjiro Sano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/344,732

(22) Filed: Jun. 10, 2021

(65) Prior Publication Data
US 2021/0409589 A1    Dec. 30, 2021

(30) Foreign Application Priority Data
Jun. 29, 2020 (JP) .............................. JP2020-111381

(51) Int. Cl.
*H04N 5/232* (2006.01)

(52) U.S. Cl.
CPC ... *H04N 5/23216* (2013.01); *H04N 5/232933* (2018.08); *H04N 5/232939* (2018.08)

(58) Field of Classification Search
CPC ......... H04N 5/23216; H04N 5/232939; H04N 5/232933; H04N 5/243; H04N 5/2352; H04N 5/52; H04N 5/53; H04N 9/77; H04N 9/67
USPC ...................................................... 348/231.6
See application file for complete search history.

(56) References Cited

U.S. PATENT DOCUMENTS

| | | | | |
|---|---|---|---|---|
| 6,603,508 | B1 * | 8/2003 | Hata ................... | H04N 5/23248 348/208.12 |
| 9,160,902 | B2 * | 10/2015 | Ishihama ............. | H04N 5/2352 |
| 10,911,684 | B2 * | 2/2021 | Sudo ................... | H04N 5/2355 |
| 2013/0242128 | A1 * | 9/2013 | Ishihama ......... | H04N 5/232411 348/222.1 |
| 2016/0112644 | A1 * | 4/2016 | Nishi ............... | H04N 5/232935 348/222.1 |
| 2017/0099380 | A1 * | 4/2017 | Lee ......................... | H03G 5/025 |
| 2019/0327423 | A1 * | 10/2019 | Sudo ................... | H04N 1/00129 |

FOREIGN PATENT DOCUMENTS

JP    2517153 B2    7/1996

* cited by examiner

*Primary Examiner* — Pritham D Prabhakher
(74) *Attorney, Agent, or Firm* — Canon U.S.A., Inc. IP Division

(57) ABSTRACT

When displaying a plurality of gain setting values on a setting screen, an apparatus performs control so as to display each of the gain setting values in a display style that makes identifiable a noise level generated as a result of amplification of a signal based on each of the gain setting values.

20 Claims, 9 Drawing Sheets

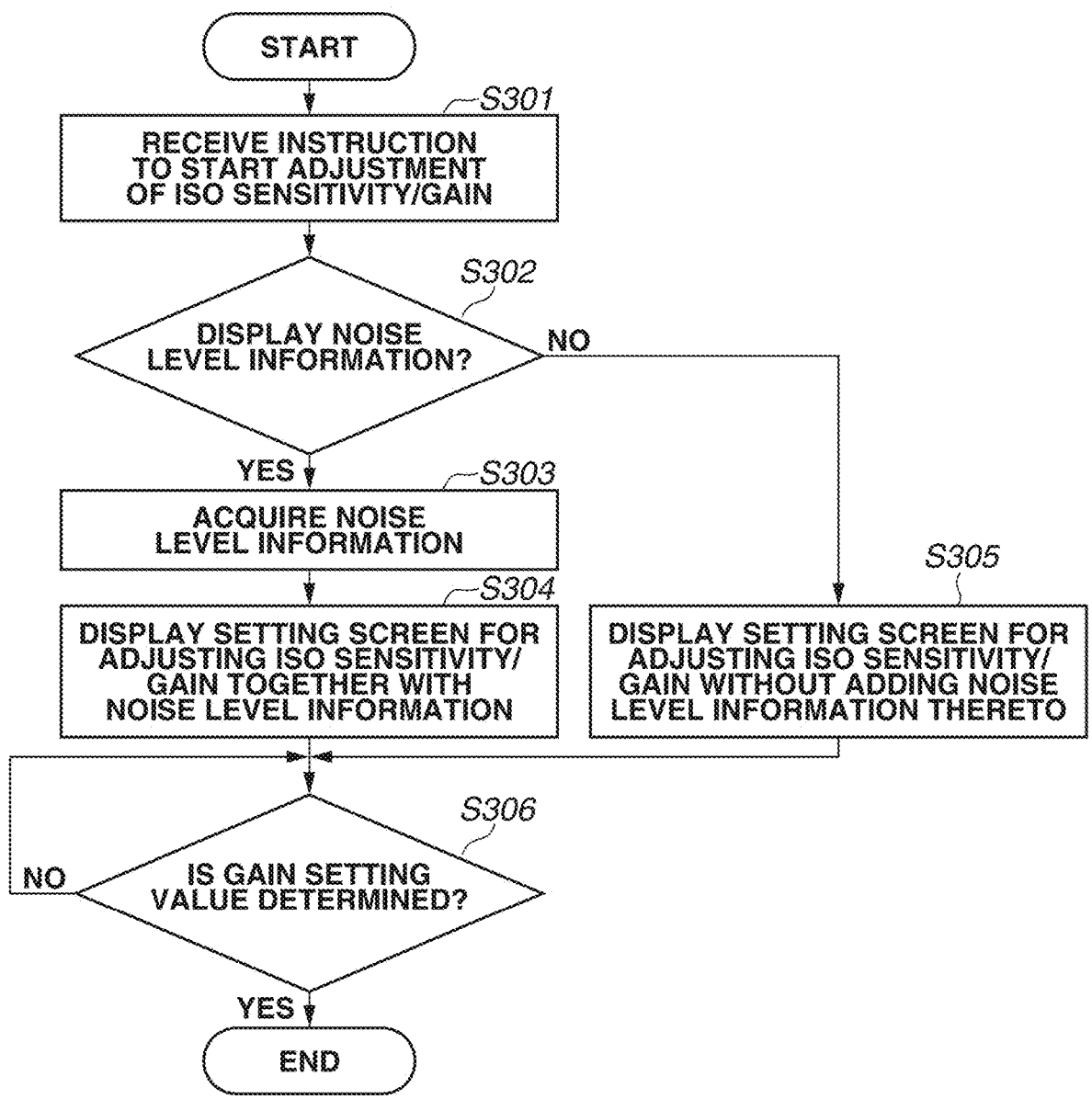

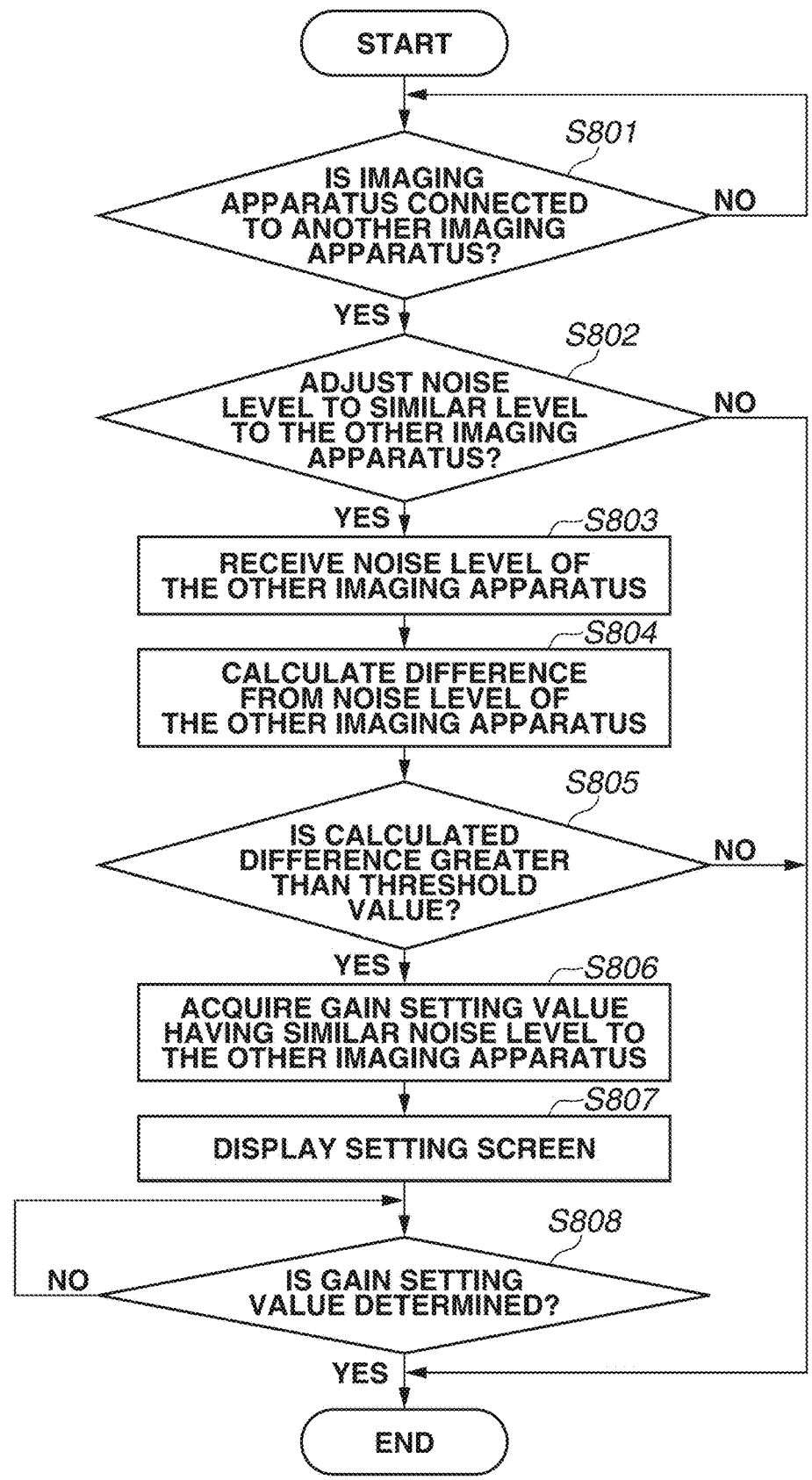

APPARATUS, METHOD FOR CONTROLLING THE SAME, AND STORAGE MEDIUM COMPUTER-READABLY STORING PROGRAM

BACKGROUND OF THE DISCLOSURE

Field of the Disclosure

The aspect of the embodiments relates to an apparatus used for again adjustment of a video image, a method for controlling it, and a program.

Description of the Related Art

In a case where a camera includes a plurality of amplifiers and a video signal is amplified using the amplifiers, conventionally, a gain of one of the amplifiers has been taken into consideration to change a gain of another amplifier according thereto (Japanese Patent Application Laid-Open No. 11-331690).

Further, a camera operator can set an amplification amount of a video amplifier by selecting any from choices expressed as International Organization for Standardization (ISO) sensitives or gains on the camera (Canon EOS C300 Instruction Manual Firmware ver. 1.1.8.1.00 and Firmware ver. 2.1.9.1.00, pages 65 to 67, November 2017).

When the video signal is amplified using the plurality of amplifiers, the following issue may arise. There is a difference between the amount of a change in the amplification factor of each of the amplifiers and the amount of a change in a noise level generated along therewith, and therefore a noise feeling may considerably change even when a difference is small between the setting value after the ISO sensitivity or the gain is changed and the original setting value. However, the camera operator cannot recognize the change in the noise feeling in advance, which causes noise different from the expected result to be generated in the video image. As a result, the camera operator undesirably ends up in an imaging failure.

SUMMARY OF THE DISCLOSURE

According to an aspect of the embodiments, an apparatus includes a conversion unit configured to convert light into a signal, an amplification unit configured to amplify the signal, a processor, and a memory storing a program which, when executed by the processor, causes the apparatus to perform control so as to display a plurality of gain setting values on a setting screen, and select a gain setting value from the plurality of gain setting values, wherein the amplification unit amplifies the signal according to the selected gain setting value, and the plurality of gain setting values is each displayed on the setting screen in a display style that makes identifiable a noise level generated as a result of the amplification of the signal.

Further features of the disclosure will become apparent from the following description of exemplary embodiments with reference to the attached drawings.

BRIEF DESCRIPTION OF THE DRAWINGS

FIG. 3 is a flowchart illustrating an example of an operation of an electronic apparatus according to the exemplary embodiment of the disclosure.

FIG. 8 is a flowchart illustrating an example of an operation of an electronic apparatus according to an exemplary embodiment of the disclosure.

DESCRIPTION OF THE EMBODIMENTS

In the following description, exemplary embodiments of the disclosure will be described in detail, by way of example, with reference to the drawings. However, components and elements that will be described in these exemplary embodiments are merely cited as examples, and are not intended to limit the scope of the disclosure to them.

Figure 1:
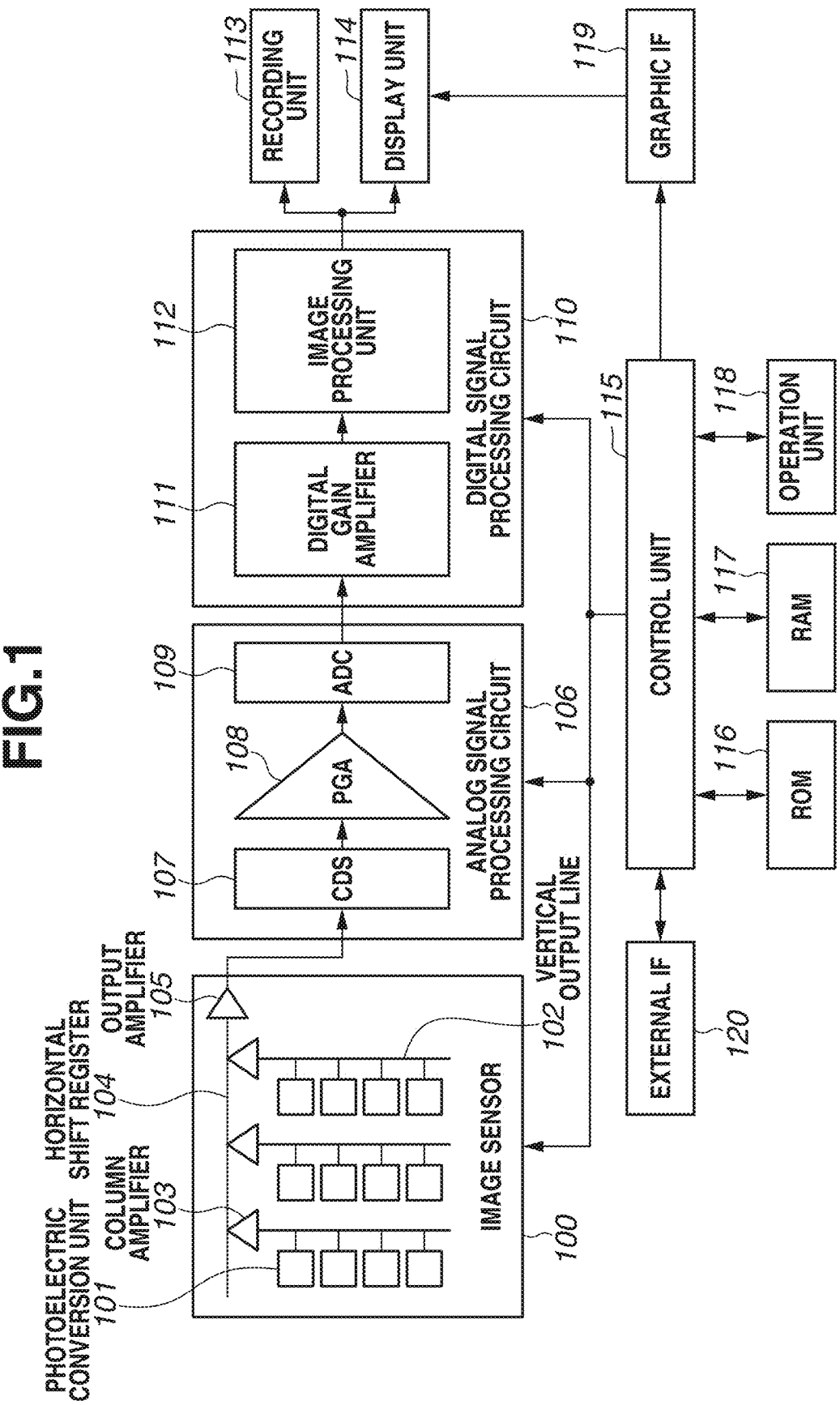
FIG. 1 is a block diagram illustrating an example of a configuration of an imaging apparatus according to an exemplary embodiment of the disclosure.

A first exemplary embodiment will be described. First, an imaging apparatus according to the present exemplary embodiment will be described with reference to FIG. 1. A control unit 115 controls various kinds of circuits such as an image sensor 100, an analog signal processing circuit 106, and a digital signal processing circuit 110.

In the present exemplary embodiment, an imaging apparatus operator performs an input operation via an operation unit 118 of the imaging apparatus to select an amplification amount (a gain setting value) of a video amplifier from choices expressed as a plurality of International Organization Standards (ISO) sensitivities or gains, thereby determining it. For example, when feeling that the video image is dark, the imaging apparatus operator makes the selection so as to increase the ISO sensitivity or the gain, thereby increasing the gain setting value to amplify the luminance of the video image, thus being able to brighten the video image. Further, the imaging apparatus operator can set a step size of a value to which the ISO sensitivity or the gain can be set by performing an input operation via the operation unit 118 of the imaging apparatus, and the choices for the value of the ISO sensitivity or the gain (the gain setting value) according to the set step size are displayed on a setting screen.

The control unit 115 performs gain control on a column amplifier 103 of the image sensor 100 and a digital amplifier 111 of the digital signal processing circuit 110 based on the gain setting value. As the gain control will be described in detail below, a program regarding the gain control is stored in a read only memory (ROM) 116 in advance and is loaded into a random access memory (RAM) 117 after the imaging apparatus is powered on, and the control unit 115 causes the various kinds of circuits to operate according to this program, by which the gain control is performed. Further, the RAM 117 is also used when a program for performing various kinds of image processing is loaded or when other calculation processing is performed.

The image sensor 100 is an element for converting light into an electric signal. The image sensor 100 includes a plurality of pixels including a photoelectric conversion unit 101, and an analog electric signal generated in the photoelectric conversion unit 101 is delivered through a vertical output line 102 and is amplified in terms of a signal level thereof by the column amplifier 103 provided for each column. The column amplifier 103 functions to amplify the analog electric signal, uses a large gain division step, and has discrete gains. The amplification factor (the gain) of the column amplifier 103 is determined based on the gain setting value set by the input operation performed by the imaging apparatus operator and the specifications of the program regarding the gain control.

The analog electric signal amplified by the column amplifier 103 is delivered through a horizontal shift register 104 and is input to an output amplifier 105. The output amplifier 105 also often has discrete gains similarly to the column amplifier 103. In the present exemplary embodiment, assume that the gain of the output amplifier 105 is a fixed value.

The analog electric signal amplified by the output amplifier 105 is input to the analog signal processing circuit 106. The analog electric signal input to the analog signal processing circuit 106 is subjected to a calculation of a difference between a reference level and the signal level in a correlated double sampling circuit (CDS) 107, by which a noise component is removed therefrom.

The analog electric signal output from the CDS 107 is input to an analog signal amplifier (a programmable gain amplifier (PGA)) 108. The PGA 108 can perform gain control using a further fine gain compared to, for example, the column amplifier 103 and the output amplifier 105 provided in the image sensor 100, but the gain of the PGA 108 is assumed to be a fixed value in the present exemplary embodiment.

The analog electric signal amplified by the PGA 108 is converted from the analog signal into a digital signal by an analog-digital (A/D) conversion circuit (ADC) 109, and, after that, is output from the analog signal processing circuit 106 and input to the digital signal processing circuit 110. The imaging apparatus has been described referring to the example in which the analog signal processing circuit 106 is configured separately from the image sensor 100 in the present exemplary embodiment, but the analog signal processing circuit 106 may be configured to be included in the image sensor 100. For example, the gain processing and/or the analog/digital conversion processing may be performed inside the image sensor 100.

The digital signal processing circuit 110 performs gain processing using the digital amplifier 111 and performs image processing such as a gamma correction and contour enhancement on the input digital electric signal using an image processing unit 112. The digital amplifier 111 has an extremely fine gain division step compared to the analog amplifiers such as the column amplifier 103 and the output amplifier 105 provided in the image sensor 100, and therefore can make a fine gain adjustment according to the gain setting value set based on the input operation performed by the imaging apparatus operator. The imaging apparatus has been described referring to the example in which the digital signal processing circuit 110 is configured separately from the image sensor 100 in the present exemplary embodiment, but the digital signal processing circuit 110 may be included in the image sensor 100.

The digital electric signal output from the digital signal processing circuit 110 is output by, for example, being recorded into a recording unit 113 or being displayed on a display unit 114.

A graphic interface 119 generates a display image such as a video image and a menu setting screen displayed on the display unit 114. The display image will be described in detail below.

An external interface 120 connects to an external apparatus such as another imaging apparatus or a display device, and transmits and receives a display image such as a video image and a menu setting screen and information such as imaging settings.

Next, the gain control according to the present exemplary embodiment will be described with reference to FIG. 2. The horizontal axis in FIG. 2 represents the gain setting value of the imaging apparatus and is changed based on, for example, the input operation performed by the imaging apparatus operator.

The vertical axis represents an analog gain indicating the gain of the column amplifier 103 of the image sensor 100, a digital gain indicating the gain of the digital amplifier 111 of the digital signal processing circuit 110, and a noise level generated in the video image from the top in this order. The noise level is a sum of a noise level generated in the video image due to an increase in the gain of the column amplifier 103 and a noise level generated in the video image due to an increase in the gain of the digital amplifier 111. The gain has been and will be described using the analog gain of the column amplifier 103 and the digital gain of the digital amplifier 111 as an example of the gain in the present exemplary embodiment, but is not limited thereto. The present exemplary embodiment can be similarly applied when amplifiers having a difference in a change in the noise level generated at the time of the gain increase (amplification) are used in combination.

Figure 2:
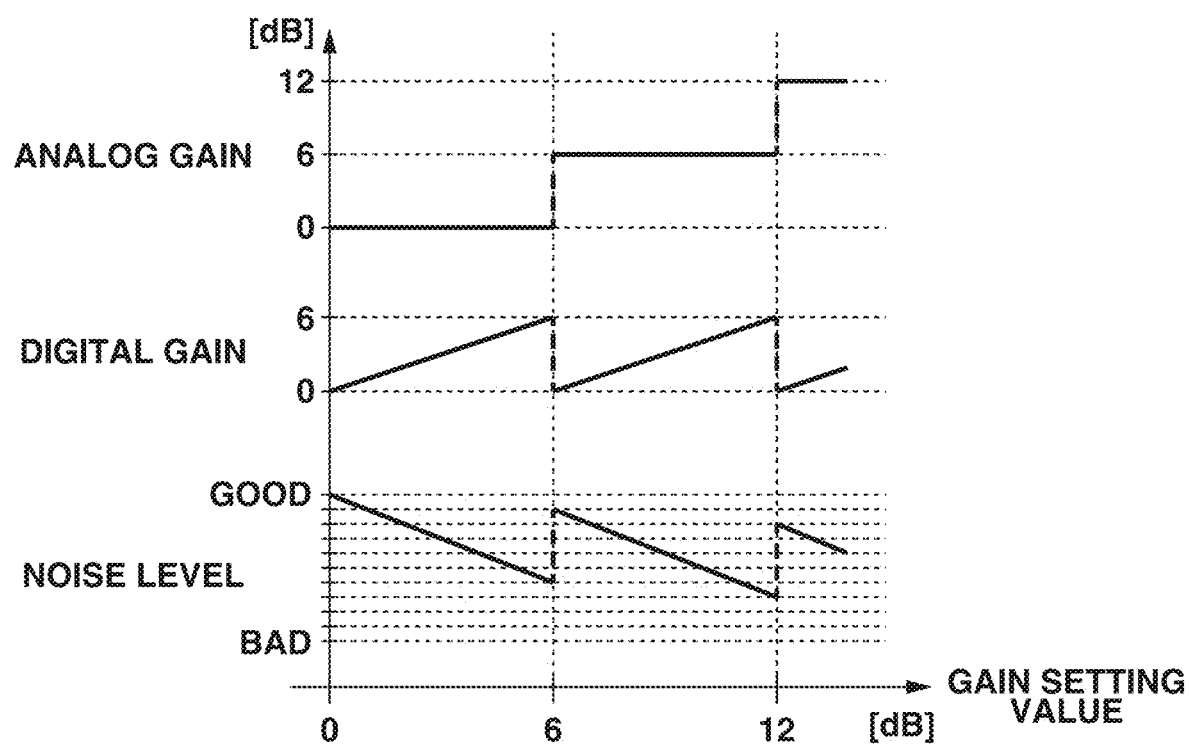
FIG. 2 is a graph indicating examples of a plurality of amplifiers, change amounts of gains thereof, and a noise level according to the exemplary embodiment of the disclosure.

For example, when the gain setting increases from the state of 0 dB to +1 dB to +2 dB, ... to +5 dB according to the input operation performed by the imaging apparatus operator, the gain of the digital gain gradually increases as indicated in the graph illustrated in FIG. 2. Further, the noise level in the video image also gradually increases in conjunction with the increase in the gain of the digital gain. The increase (deterioration) in the noise level as a result of the gain increase using the digital gain is remarkably great compared to a change in the noise level due to the analog gain.

Then, when the gain setting reaches +6 dB, the digital gain is switched from 6 dB to 0 dB at the same time as the analog gain switched from 0 dB to +6 dB. At this time, because the gain based on the digital gain, which is a main cause for deteriorating the noise level while the gain setting value is 0 dB to +5 dB, becomes zero, the noise level suddenly reduces and is improved when the gain setting reaches +6 dB. The noise amplified when the gain is applied based on the analog gain is noise generated before the analog electric signal is input to the analog gain, and therefore the noise level is less amplified compared to the digital gain.

In the present exemplary embodiment, the range of the gain to which the digital gain can be set is assumed to be 0 dB to 6 dB, and the imaging apparatus performs control so as to switch the gain to the gain of the analog gain (+6 dB) when the gain setting value reaches 6 dB. Due to this control, the present exemplary embodiment allows the imaging apparatus to achieve an increase in the dynamic range, a gain adjustment with high precision (the number of steps), and the improvement of the noise feeling while preventing a sudden change in the luminance in the video image.

However, the gain control working as illustrated in FIG. 2 may undesirably result in a video image captured with a considerably different noise level even when the imaging apparatus operator finely adjusts the gain setting value, if the range of the fine adjustment contains the point at which the digital gain and the analog gain are switched. However, it is difficult for the imaging apparatus operator to expect that the noise level in the video image is suddenly considerably changed due to his/her adjustment because he/she finely adjusts the gain setting value from his/her perspective. Further, it is difficult for the imaging apparatus operator to figure out the content of the gain control performed in the above-described manner and understand in advance which gain setting leads to a sudden change in the noise level. This raises the necessity of allowing the imaging apparatus operator to easily recognize the difference in the noise level generated as a result the adjustment of the gain setting when performing the input operation via the operation unit 118 of the imaging apparatus and setting the amplification amount of the video amplifier by selecting the ISO sensitivity or the gain.

In the present exemplary embodiment, when the imaging apparatus operator adjusts the amplification amount of the video amplifier by selecting the ISO sensitivity or the gain, the imaging apparatus notifies the imaging apparatus operator of the change in the noise level generated as a result this adjustment. Next, an example of an operation therefor will be described with reference to FIG. 3.

The operation illustrated in the flowchart of FIG. 3 is realized by the control unit 115 reading out the program from the RAM 117 and executing it.

In step S301, the control unit 115 receives an instruction for starting the adjustment of the ISO sensitivity or the gain in response to an input operation performed by the imaging apparatus operator via the operation unit 118. For example, the imaging apparatus operator performs an input operation via the operation unit 118, by which a setting menu including a plurality of items settable on the imaging apparatus is displayed, and an item corresponding to the adjustment of the ISO sensitivity or the gain is selected therefrom and is determined.

Then, in step S302, the control unit 115 determines whether to display noise level information indicating the change in the noise level on the setting screen in response to an input operation performed by the imaging apparatus operation via the operation unit 118. For example, the control unit 115 displays a dialog screen inquiring whether to display the noise level information on the display unit 114, and stores a result of a selection that the imaging apparatus operator makes by performing the input operation via the operation unit 118 into the ROM 116 in advance. Then, the control unit 115 makes the determination of step S302 by referring to the enablement/disablement of the display of the noise level information stored in the ROM 116. Alternatively, the control unit 115 may determine the enablement/disablement of the display of the noise level information according to the imaging mode set to the imaging apparatus. More specifically, examples of such an imaging mode include a bracketing imaging mode of continuously capturing a plurality of images while changing the parameters, and a 360-degree image capturing mode or a panorama imaging mode of capturing a plurality of images and combining them into one image. When the imaging apparatus is set to an imaging mode leading to an issue if the noise level is different among a plurality of captured video images, like these examples, the control unit 115 determines to "enable" the display of the noise level information.

If determining to display the noise level information on the setting screen (YES in step S302), in step S303, the control unit 115 acquires the noise level information indicating the noise level corresponding to the gain setting value from the RAM 117. Then, in step S304, the control unit 115 performs display control so as to display a setting screen like examples illustrated in FIGS. 4A to 4H on the display unit 114 while making the noise level identifiable for each gain setting value. The noise level information indicates the value of the noise level for each gain setting value like the example described with reference to FIG. 2. Alternatively, the noise level information indicates such a gain setting value at which the noise level is considerably changed (the difference in the noise level is greater than a threshold value) compared to the preceding and subsequent gain setting values.

On the other hand, if determining not to display the noise level information on the setting screen (NO in step S302), in step S305, the control unit 115 performs control so as to display the setting screen on the display unit 114 without displaying the noise level information.

If any gain setting value is selected from the plurality of gain setting values displayed on the setting screen and is determined in response to the input operation performed by the imaging apparatus operator via the operation unit 118 (YES in step S306), the control unit 115 ends the present processing.

Then, the imaging apparatus determines the amplification factors (the gains) of the analog gain and the digital gain based on the gain setting value determined in step S306 and the specifications of the program regarding the gain control, and performs the gain control working as described above.

In the present exemplary embodiment, the enablement/disablement of the display of the noise level information is determined in step S302 before the setting screen is displayed in step S304 or S305. However, the display control is not limited thereto, and may be performed so as to determine the enablement/disablement of the display of the noise level after displaying the setting screen and switch the content displayed on the setting screen according to the determination result.

Next, the examples of the setting screen displayed in step S304 according to the present exemplary embodiment will be described with reference to FIGS. 4A to 4H. In the present exemplary embodiment, the setting screen is displayed on the display unit 114 while the luminance, color, and/or size of the characters indicating the gain, the luminance and/or color of the background of the characters, and/or the icon is/are changed for each gain so as to allow the imaging apparatus operator to easily identify the relationship between the gain and the noise level displayed on the setting screen. Alternatively, an item expressing the noise level in the form of a graph can be displayed on the display unit 114 in addition to the gain.

Figure 4A:
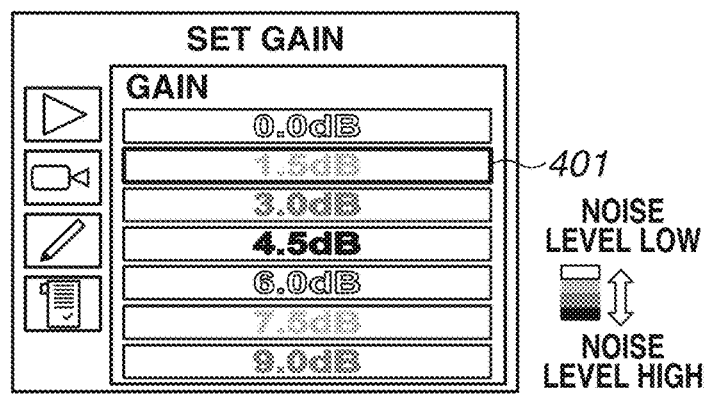
FIGS. 4A to 4H illustrate examples of a display style of a setting screen according to the exemplary embodiment of the disclosure.

In FIG. 4A, the setting screen expresses the noise level for each gain setting value 401 by changing the luminance of the characters thereof, and indicates that the noise level reduces according to an increase in the luminance of the characters indicating the gain whereas the noise level increases according to a reduction in the luminance of the characters indicating the gain. Alternatively, the setting screen may be displayed so as to indicate that the noise level reduces according to a reduction in the luminance of the characters indicating the gain whereas the noise level increases according to an increase in the luminance of the characters indicating the gain.

Figure 4B:
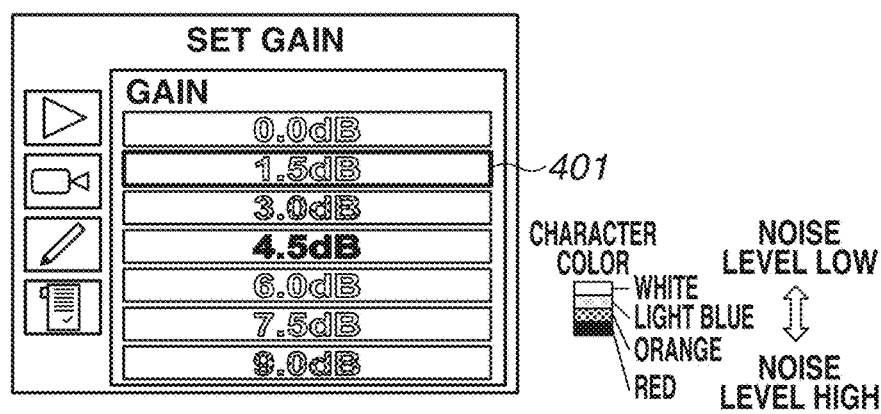

In FIG. 4B, the setting screen expresses the noise level for each gain setting value 401 by changing the color of the characters thereof, and presents the characters indicating the gain in white, light blue, orange, and red in the ascending order of the noise level. The colors of the characters may be a combination of other colors or may be assigned in a different order as long as the imaging apparatus operator can identify them.

Figure 4C:
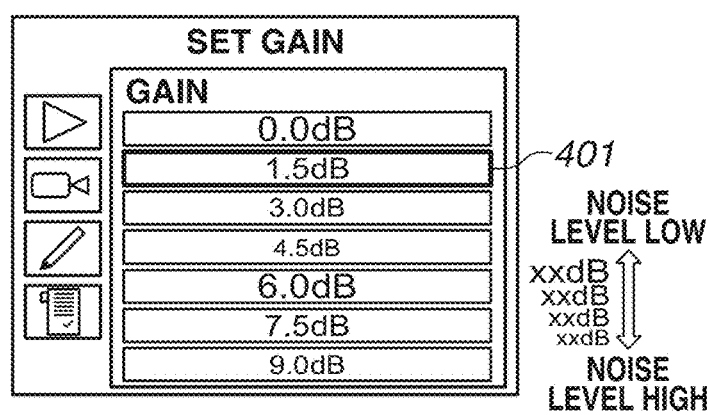

In FIG. 4C, the setting screen expresses the noise level for each gain setting value 401 by changing the size of the characters thereof, and indicates that the noise level reduces according to an increase in the size of the characters indicating the gain whereas the noise level increases according to a reduction in the size of the characters of the gain. Alternatively, the setting screen may be displayed so as to indicate that the noise level reduces according to a reduction in the size of the characters indicating the gain whereas the noise level increases according to an increase in the size of the characters of the gain.

Figure 4D:
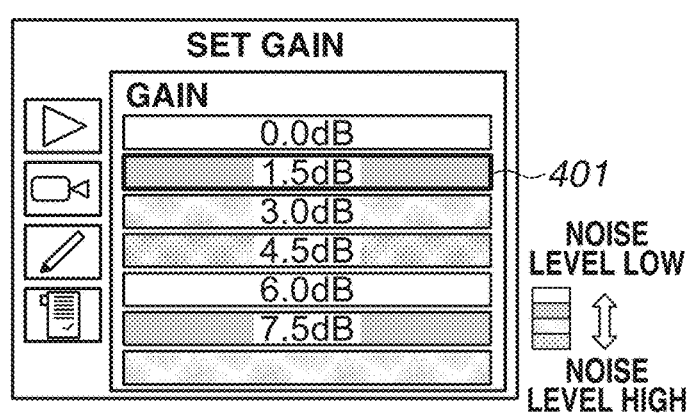

In FIG. 4D, the setting screen expresses the noise level for each gain setting value 401 by changing the luminance of the background of the characters thereof, and indicates that the noise level reduces as the background of the characters of the gain becomes brighter whereas the noise level increases as the background of the characters of the gain becomes darker. Alternatively, the setting screen may be displayed so as to indicate that the noise level reduces as the background of the characters of the gain becomes darker whereas the noise level increases as the background of the characters of the gain becomes brighter.

Figure 4E:
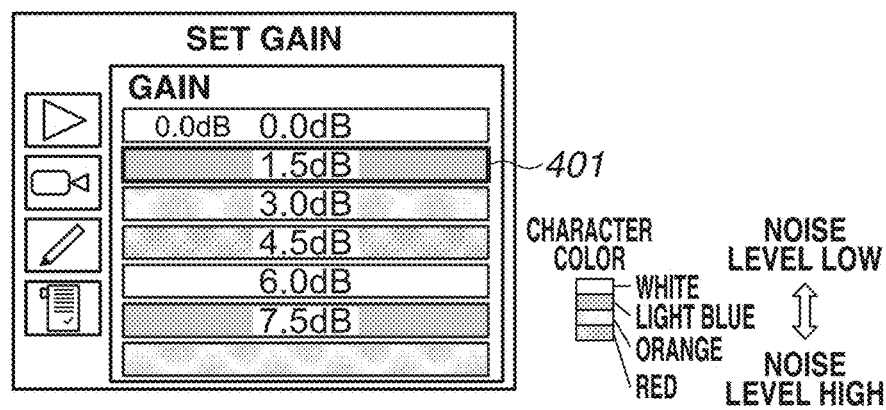

In FIG. 4E, the setting screen expresses the noise level for each gain setting value 401 by changing the color of the background of the characters thereof, and presents the background of the characters of the gain in white, light blue, orange, and red in the ascending order of the noise level. The colors of the background may be a combination of other colors or may be assigned in a different order as long as the imaging apparatus operator can identify them.

Figure 4F:
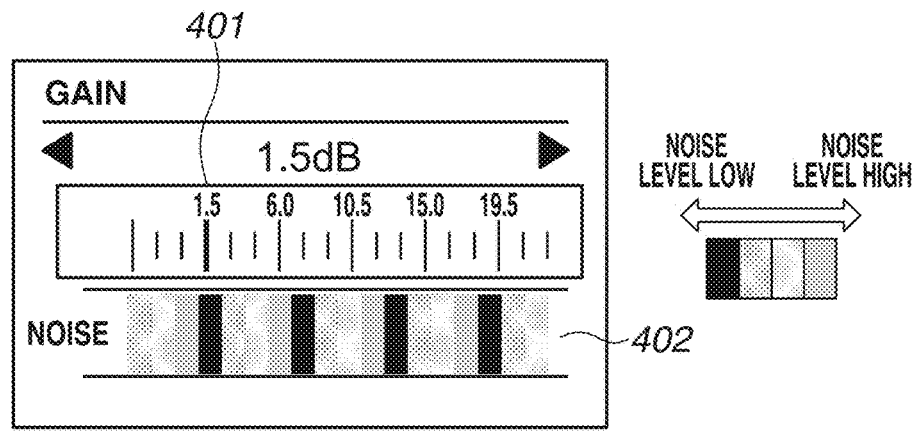

In FIG. 4F, the setting screen expresses the noise level for each gain setting value 401 by changing the luminance thereof in a graph 402, and indicates that the noise level reduces as the color in the graph 402 becomes brighter whereas the noise level increases as the color in the graph 402 becomes darker. Alternatively, the setting screen may be displayed so as to indicate that the noise level reduces as the color in the graph 402 becomes darker whereas the noise level increases as the color in the graph 402 becomes brighter.

Figure 4G:
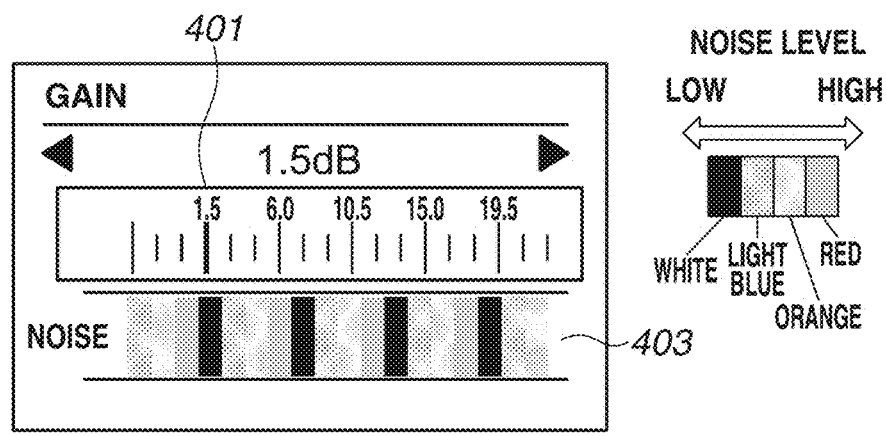

In FIG. 4G, the setting screen expresses the noise level for each gain setting value 401 by changing the color in a graph 403, and presents the graph 403 in white, light blue, orange, and red in the ascending order of the noise level. The colors in the graph 403 may be a combination of other colors or may be assigned in a different order as long as the imaging apparatus operator can identify them.

Figure 4H:
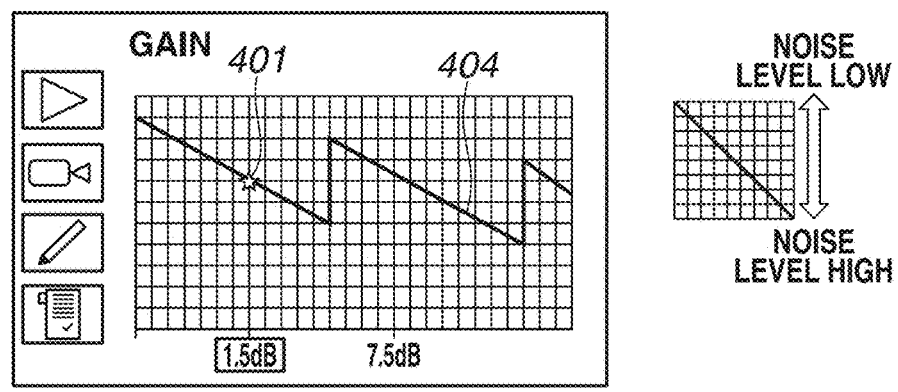

In FIG. 4H, the setting screen expresses the noise level for each gain setting value 401 in the form of a line chart 404, and a vertical axis and a horizontal axis of the line chart 404 represent the noise level and the gain, respectively. Alternatively, the vertical axis and the horizontal axis may represent the gain and the noise level, respectively.

Further, the ISO sensitivity may be presented instead of the gain as the gain setting value on the setting screen. In this case, the information about the gain in FIGS. 4A to 4H can be replaced with the information about the ISO sensitivity and the ISO sensitivity can be displayed in a display style expressing the noise level corresponding to each ISO sensitivity.

The control unit 115 may detect the operation state of the imaging apparatus, and perform control so as not to display the setting screen for adjusting the ISO sensitivity or the gain on the display unit 114 if the imaging apparatus is in the process of imaging and recording. This control allows the imaging apparatus to prevent a change in the noise generated in the video image in the middle of imaging.

A second exemplary embodiment will be described as a configuration in which the imaging apparatus notifies the imaging apparatus operator of a difference from the noise level of the gain setting value selected immediately before that as the change in the noise level generated as a result of the adjustment of the gain setting, when the amplification amount of the video amplifier is set by selecting the ISO sensitivity or the gain. The present exemplary embodiment will be described, omitting the descriptions of configurations shared with the first exemplary embodiment.

Figure 5:
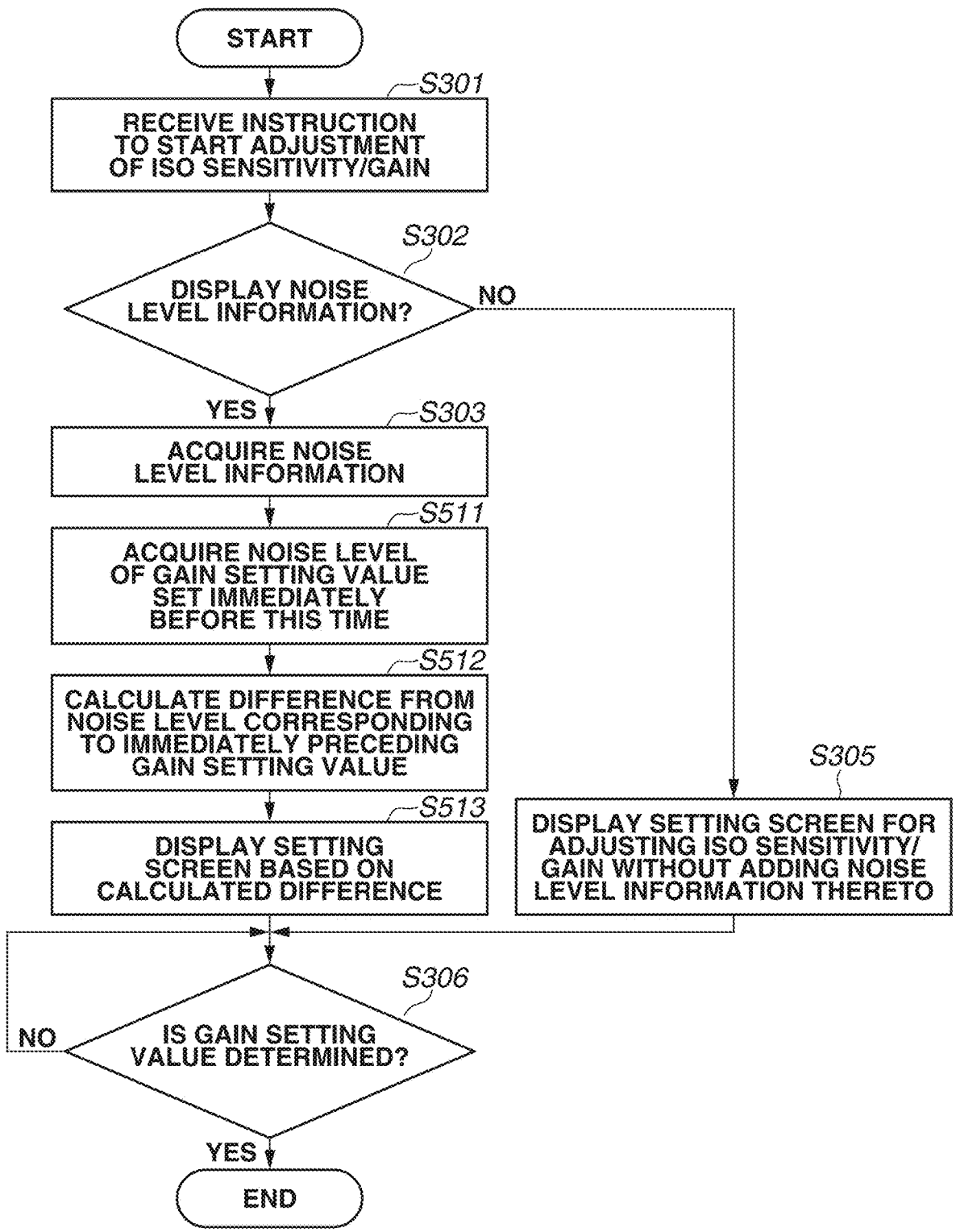
FIG. 5 is a flowchart illustrating an example of an operation of an electronic apparatus according to an exemplary embodiment of the disclosure.

The operation illustrated in the flowchart of FIG. 5 is realized by the control unit 115 reading out the program from the RAM 117 and executing it. In step S511, the control unit 115 acquires the noise level corresponding to the currently selected gain setting value after performing the operations in steps S301 to S303. Next, in step S512, the control unit 115 calculates a difference between the noise level for each gain setting value acquired in step S303 and the noise level corresponding to the currently selected gain setting value acquired in step S511.

Figure 6:
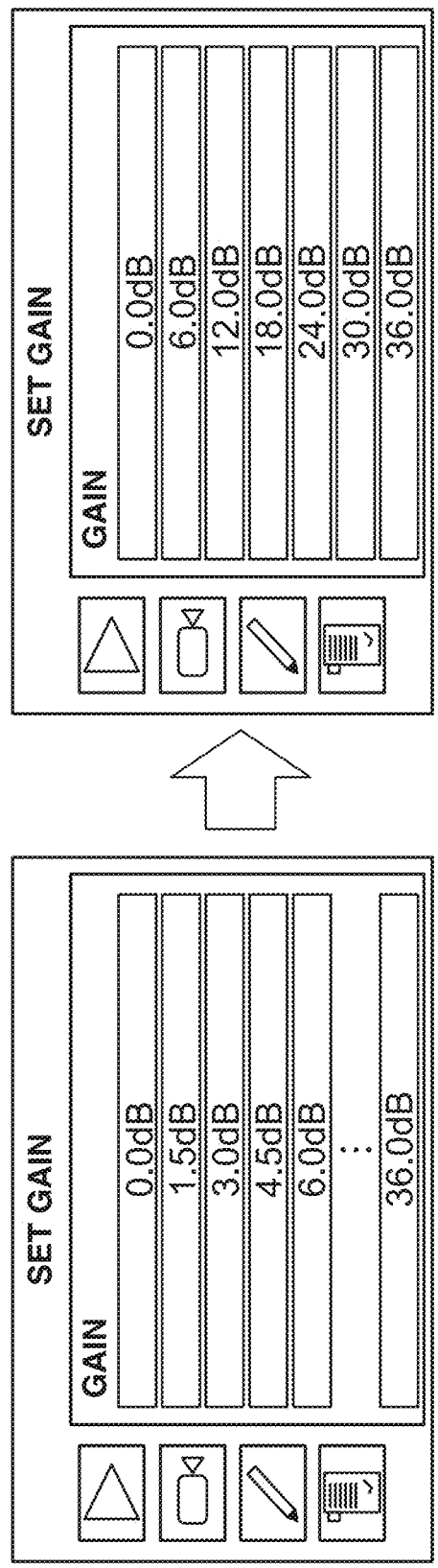
FIG. 6 illustrates an example of a display style of a setting screen according to the exemplary embodiment of the disclosure.
Figure 7:
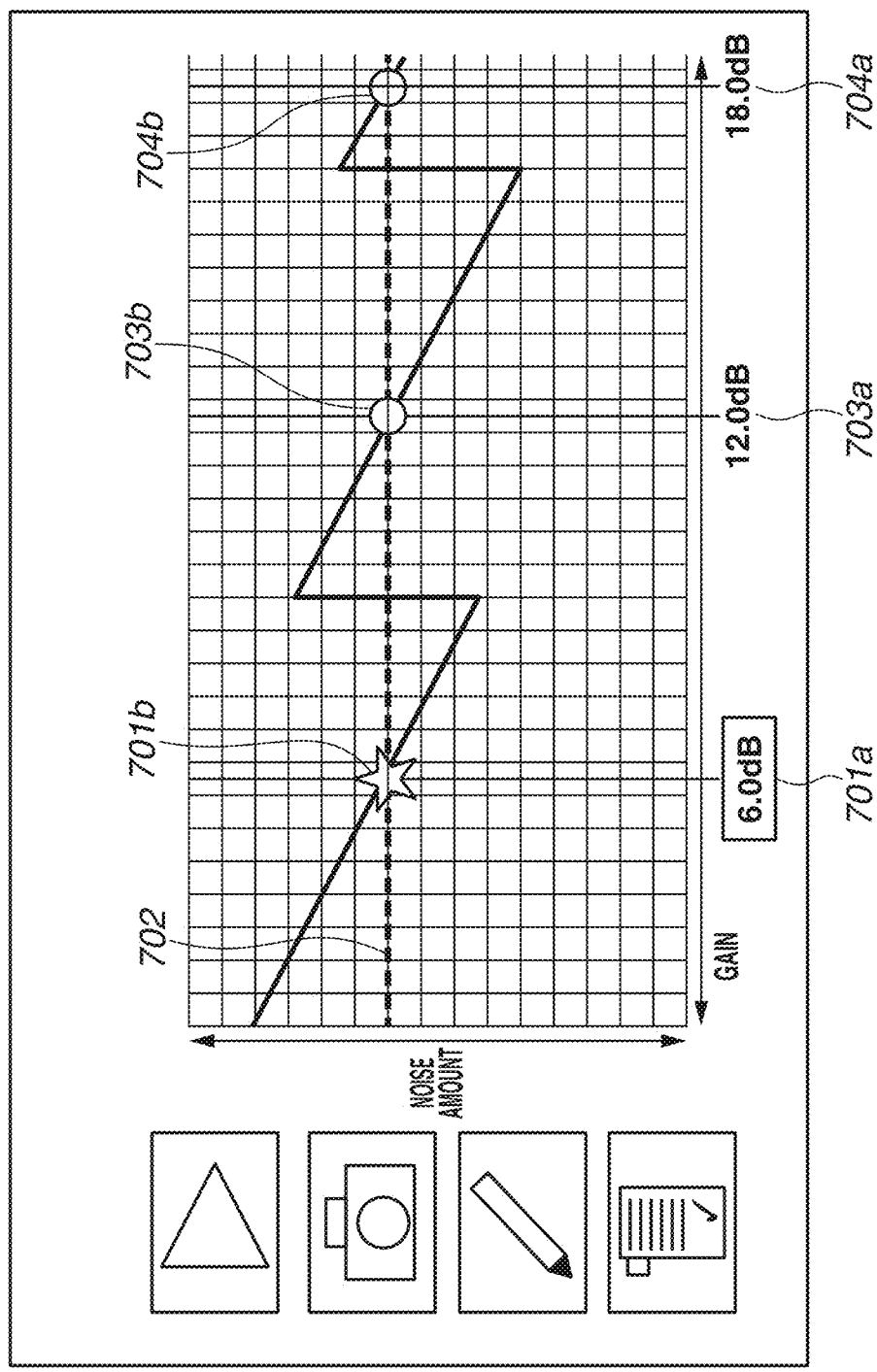
FIG. 7 illustrates an example of the display style of the setting screen according to the exemplary embodiment of the disclosure.

Then, in step S513, the control unit 115 displays the setting screen on the display unit 114 while changing the display style for each gain setting value according to the calculated difference. For example, in FIG. 6, the gain setting values are displayed on the setting screen by being rearranged in the ascending order of the difference from the noise level corresponding to the currently selected gain setting value. This display allows the imaging apparatus operator to easily recognize the gain setting value having a similar noise level to the currently selected gain setting value and thereby selecting the desired gain setting value while reducing the change in the noise level. Alternatively, the control unit 115 may perform the display control so as to display a gain setting value having a noise level different from the noise level of the currently selected gain setting value by a smaller amount than a threshold value on the setting screen. Alternatively, the control unit 115 may perform the display control so as to display the setting screen that allows the imaging apparatus operator to select a gain setting value having a noise level different from the noise level of the currently selected gain setting value by a smaller amount than a threshold value on the setting screen. Alternatively, in the case where the noise level for each gain is expressed in the form of a line chart, the noise level of a currently selected gain setting value 701*a* is indicated by a star mark 701*b* as illustrated in FIG. 7. Further, the noise level corresponding to the currently selected gain setting value is indicated by a dotted line 702, and other gain setting values 703*a* and 704*a* having the noise level of the currently selected gain setting value are indicated by circle marks 703*b* and 704*b*. This display allows the imaging apparatus operator to select the desired gain setting value from gain setting values having similar noise levels to the noise level corresponding to the currently selected gain setting value while recognizing the change in the noise level in further detail.

Further, the control unit 115 may perform control so as to display a gain setting value having a noise level different from the noise level of the currently selected gain setting value by a smaller amount than a threshold value on the setting screen if the imaging apparatus is in the process of imaging and recording. This control allows the imaging apparatus to prevent a change in the noise generated in the video image in the middle of imaging.

A third exemplary embodiment will be described regarding an operation in which the imaging apparatus notifies the imaging apparatus operator for the purpose of adjusting the noise level to a level similar to another imaging apparatus in a case where the imaging apparatus is capable of communicating with the other imaging apparatus.

The operation illustrated in the flowchart of FIG. 8 is realized by the control unit 115 reading out the program from the RAM 117 and executing it. If the imaging apparatus is connected to another imaging apparatus (YES in step S801) and if the imaging apparatus is set so as to adjust the noise level to a similar level thereto (YES in step S802), in step S803, the control unit 115 receives the noise level corresponding to the currently selected gain setting value on the other imaging apparatus. In step S804, the control unit 115 calculates a difference between the noise level corresponding to the currently selected gain setting value and the noise level received in step S803. Then, if the difference is greater than a threshold value (YES in step S805), in step S806, the control unit 115 acquires the gain setting value having a similar noise level to the noise level on the other imaging apparatus. In step S807, the control unit 115 performs control so as to display the gain setting value acquired in step S806 on the setting screen while making it identifiable. At this time, the control unit 115 may make the gain setting value identifiable by changing, for example, the color of the characters of the gain setting value as described above or may make the gain setting value identifiable by displaying the acquired gain setting value and hiding gain setting values other than that. If any gain setting value is selected from the plurality of gain setting values displayed on the setting screen and is determined in response to the input operation performed by the imaging apparatus operator via the operation unit 118 (YES in step S808), the control unit 115 ends the present processing.

If the imaging apparatus is not set so as to adjust the noise level to a similar level (NO in step S802) or if the difference is not greater than the threshold value (NO in step S805), the control unit 115 ends the present processing.

The first to third exemplary embodiments have been described assuming that the imaging apparatus performs the above-described operation, but can also be realized similarly on another electronic apparatus, such as a personal computer, a smart-phone, and a tablet terminal. Further, the above-described exemplary embodiments may be realized by a plurality of electronic apparatuses instead of a single electronic apparatus. For example, a tablet terminal may include a communication unit capable of communicating with an imaging apparatus, a display unit, and an operation unit, and acquire the choices for the gain setting value of the ISO sensitivity or the gain adjustable on the imaging apparatus and the noise level information for each gain setting value from the imaging apparatus via the communication unit. Then, the tablet terminal can display the setting screen on the display unit, determine the gain setting value in response to an input operation performed by a tablet terminal operator via the operation unit, and transmit the determined gain setting value to the imaging apparatus via the communication unit. The imaging apparatus performs the gain control according to the gain setting value received from the tablet terminal and the specifications of the program regarding the gain control.

According to an aspect of the embodiments, it is possible to achieve the advantageous effect of allowing the imaging apparatus operator to adjust the desired ISO sensitivity or gain while recognizing the change in the noise feeling due to the amplification of the video signal when the camera amplifies the video signal using the plurality of amplifiers.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-111381, filed Jun. 29, 2020, which is hereby incorporated by reference herein in its entirety.

What is claimed is:

1. An apparatus comprising:
a conversion unit configured to convert light into a signal;
an amplification unit configured to amplify the signal;
a processor; and
a memory storing a program which, when executed by the processor, causes the apparatus to:
perform control so as to display a plurality of gain setting values on a setting screen; and
select a gain setting value from the plurality of gain setting values,
wherein the amplification unit amplifies the signal according to the selected gain setting value, and the plurality of gain setting values is each displayed on the setting screen in a display style that makes identifiable a noise level generated as a result of the amplification of the signal.

2. The apparatus according to claim 1, wherein the amplification unit includes an analog amplifier configured to amplify an analog signal and a digital amplifier configured to amplify a digital signal generated by digitally converting the amplified analog signal.

3. The apparatus according to claim 2, wherein the noise level is a sum of a noise level generated in the analog amplifier and a noise level generated in the digital amplifier.

4. The apparatus according to claim 1, wherein the plurality of gain setting values is displayed with a size of a character, a color of the character, a color of a background of the character, and/or an icon changed for each of the gain setting values based on the noise level.

5. The apparatus according to claim 1, wherein the plurality of gain setting values is displayed on the setting screen in correspondence with a set step size.

6. The apparatus according to claim 1, wherein the program when executed by the processor further causes the apparatus to determine whether to display the gain setting values in the display style that makes the noise level identifiable, and
wherein the gain setting values are displayed in the display style that makes the noise level identifiable according to a result of the determination.

7. The apparatus according to claim 1, wherein the plurality of gain setting values is displayed on the setting screen in a display style that makes identifiable a difference between a noise level of a currently selected gain setting value and a noise level of another gain setting value.

8. The apparatus according to claim 1, wherein the plurality of gain setting values is displayed on the setting screen in a display style that makes selectable a gain setting value having a noise level different from a noise level of a currently selected gain setting value by a smaller amount than a threshold value in a case where the apparatus is an operation state in the process of imaging and recording.

9. The apparatus according to claim 1, wherein the setting screen is not displayed in a case where the apparatus is an operation state in the process of imaging and recording.

10. The apparatus according to claim 1, wherein the program when executed by the processor further causes the apparatus to communicate with another apparatus, and
wherein the plurality of gain setting values is displayed in a display style that makes selectable a gain setting value having a noise level different from a noise level of a gain setting value set on the other apparatus by a smaller amount than a threshold value.

11. A method for controlling a display of a gain setting value, the method comprising:
converting light into a signal;
performing control so as to display a plurality of gain setting values on a setting screen;
selecting a gain setting value from the plurality of gain setting values; and
amplifying the signal according to the selected gain setting value,
wherein the plurality of gain setting values is each displayed on the setting screen in a display style that makes identifiable a noise level generated as a result of the amplification of the signal.

12. The method according to claim 11, wherein the plurality of gain setting values is displayed with a size of a character, a color of the character, a color of a background of the character, and/or an icon changed for each of the gain setting values based on the noise level.

13. The method according to claim 11, wherein the plurality of gain setting values is displayed on the setting screen in correspondence with a set step size.

14. The method according to claim 11, further comprising determining whether to display the gain setting values in the display style that makes the noise level identifiable,
wherein the gain setting values are displayed in the display style that makes the noise level identifiable according to a result of the determination.

15. The method according to claim 11, wherein the plurality of gain setting values is displayed on the setting screen in a display style that makes identifiable a difference between a noise level of a currently selected gain setting value and a noise level of another gain setting value.

16. A non-transitory computer-readable storage medium storing a program for executing the method, the method comprising:
converting light into a signal;
performing control so as to display a plurality of gain setting values on a setting screen;
selecting a gain setting value from the plurality of gain setting values; and
amplifying the signal according to the selected gain setting value,
wherein the plurality of gain setting values is each displayed on the setting screen in a display style that makes identifiable a noise level generated as a result of the amplification of the signal.

17. The non-transitory computer-readable storage medium according to claim 16, wherein the plurality of gain setting values is displayed with a size of a character, a color of the character, a color of a background of the character, and/or an icon changed for each of the gain setting values based on the noise level.

18. The non-transitory computer-readable storage medium according to claim 16, wherein the plurality of gain setting values is displayed on the setting screen in correspondence with a set step size.

19. The non-transitory computer-readable storage medium according to claim 16, further comprising determining whether to display the gain setting values in the display style that makes the noise level identifiable,
wherein the gain setting values are displayed in the display style that makes the noise level identifiable according to a result of the determination.

20. The non-transitory computer-readable storage medium according to claim 16, wherein the plurality of gain setting values is displayed on the setting screen in a display style that makes identifiable a difference between a noise level of a currently selected gain setting value and a noise level of another gain setting value.

* * * * *